A. M. ALLEN.
SKIRT MEASURING DEVICE.
APPLICATION FILED JUNE 6, 1908.

970,006.

Patented Sept. 13, 1910.
2 SHEETS—SHEET 1.

WITNESSES
E. G. Bromley
E. B. Marshall

INVENTOR
Anna Mary Allen
BY Munn & Co
ATTORNEYS

A. M. ALLEN.
SKIRT MEASURING DEVICE.
APPLICATION FILED JUNE 6, 1908.
970,006.
Patented Sept. 13, 1910.
2 SHEETS—SHEET 2.
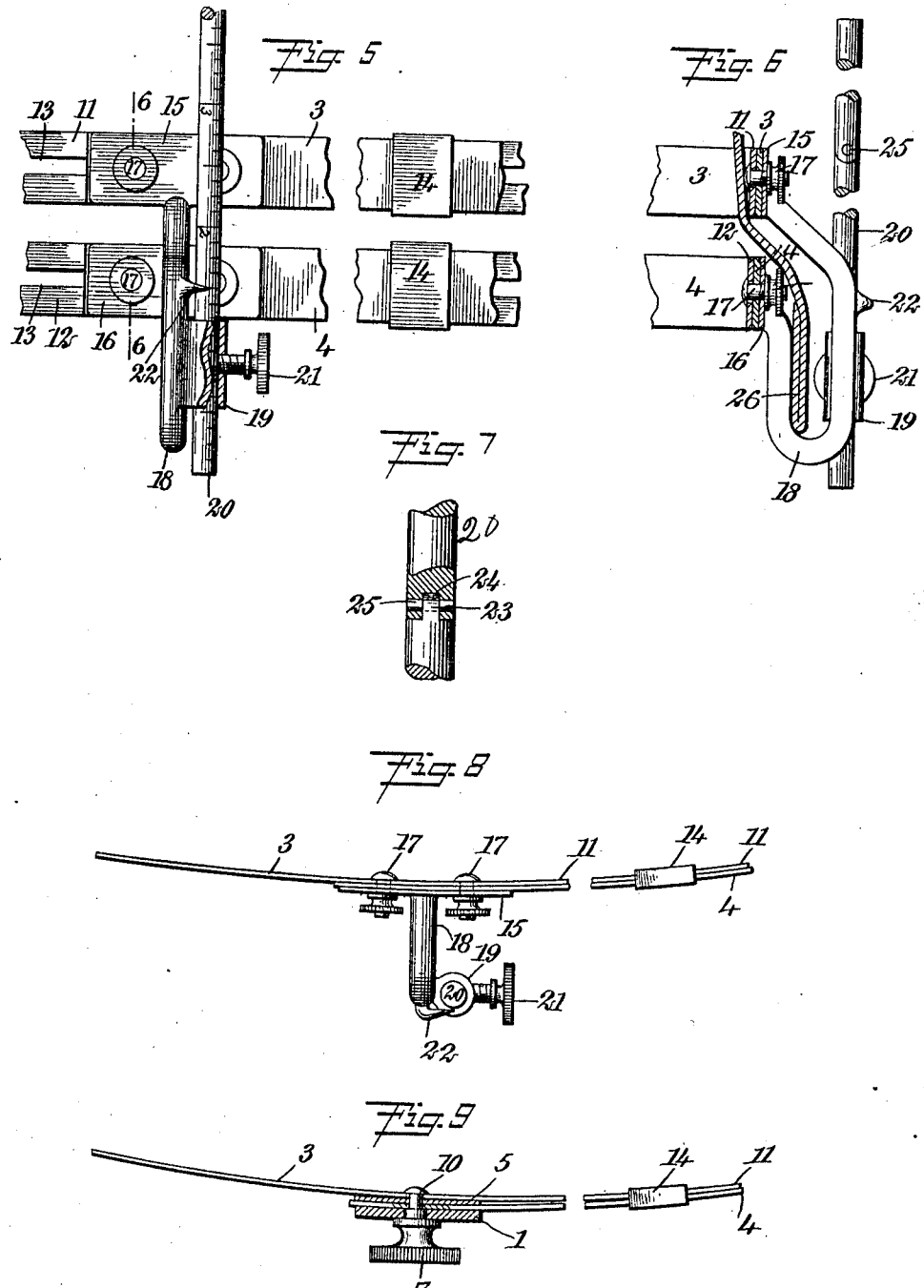
WITNESSES
E. G. Bromley
E. B. Marshall
INVENTOR
Anna Mary Allen
BY
Munn & Co.
ATTORNEYS

UNITED STATES PATENT OFFICE.

ANNA MARY ALLEN, OF YUBA CITY, CALIFORNIA.

SKIRT-MEASURING DEVICE.

970,006.  Specification of Letters Patent.  Patented Sept. 13, 1910.

Application filed June 6, 1908. Serial No. 437,098.

*To all whom it may concern:*

Be it known that I, ANNA MARY ALLEN, a citizen of the United States, and a resident of Yuba City, in the county of Sutter and State of California, have invented a new and Improved Skirt-Measuring Device, of which the following is a full, clear, and exact description.

My invention relates to skirt measuring devices, and has for its object to provide a device which will permit the dressmaker to measure a skirt on a person to ascertain the length, without turning the skirt inside out, the measuring device being disposed outside of the skirt, with parallel guides and holders disposed circumferentially around the skirt. In order to obtain the best results, it is necessary to measure the skirt from the outside, in order that the dressmaker may see the markings clearly; and the skirt must not be turned inside out, for if this is done the proper hang of the skirt will not be obtained because the forms of most people are not the same on both sides.

Other objects of the invention will appear in the following more complete description of the invention.

In this specification I will describe my preferred form of the invention, but it will be understood that I do not limit myself thereto, as I consider myself entitled to all forms and embodiments of the invention, which may be held to fall within the scope of the appended claims.

Reference is to be had to the accompanying drawings, forming a part of this specification, in which similar characters of reference indicate corresponding parts in all the figures, in which—

Figure 1:
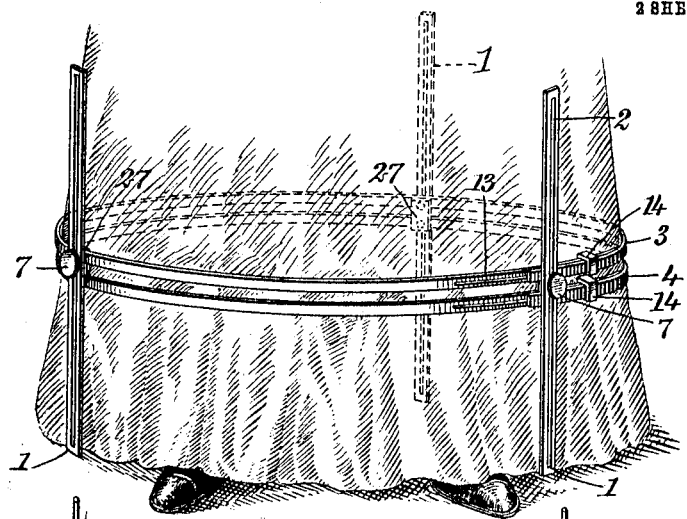
Figure 2:
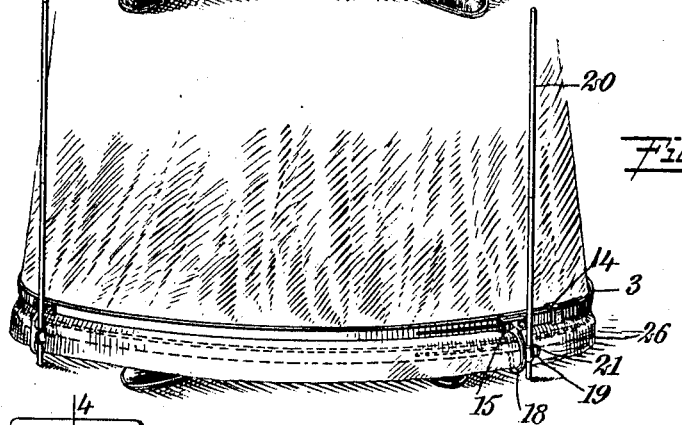
Figure 3:
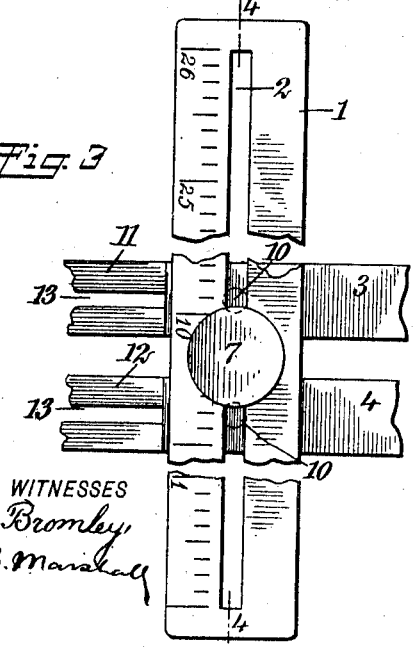
Figure 4:
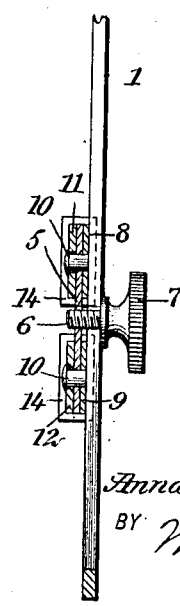

Figure 1 is a perspective view of the measuring device in use; Fig. 2 is a perspective view of a slightly modified form in use; Fig. 3 is a view showing the means by which the parallel guides are secured to the standard, the arrangement being that shown in Fig. 1; Fig. 4 is a sectional view on the line 4—4 of Fig. 3; Fig. 5 is an enlarged view showing the means by which the guides are secured to the standard, the arrangement being that shown in Fig. 2; Fig. 6 is a sectional view on the line 6—6 of Fig. 5; Fig. 7 is a sectional view showing the means by which the standards are extended; Fig. 8 is a plan view showing the guides and one of the standards, the arrangement being that which is shown in Fig. 2, and Fig. 9 is a plan view of the guides and one of the standards, the arrangement being that which is shown in Fig. 1.

By referring to Fig. 1 of the drawings, it will be seen that I provide preferably three standards 1, each having a slot 2, therein. To these standards are secured two hoops or guides 3 and 4, by means of a plate 5, shown in section in Fig. 4, or a plate 27 shown in full and dotted lines in Fig. 1, which plates have a screw thread therein in which meshes a screw thread 6 on a thumbscrew 7, the thumbscrew 7 being adapted to draw the plate 5 or 27 against the standard 1, and hold it in place relatively thereto. The thumbscrew 7 slides in the slot 2 in the standard 1, so that the hoops or guides 3 and 4 may be disposed at any desired height and a scale may be provided on the standard 1 so that a dressmaker can quickly ascertain at what height the hoops or guides 3 and 4 are disposed. Two of the standards are secured to the hoops or guides 3 and 4 merely by having the hoops or guides 3 and 4 pass between the plate 27 and the standard 1, and by turning the thumbscrew 7 so that the plate 27 is drawn toward the standard 1, the hoops or guides 3 and 4 are held firmly to the standard. The arrangement by which the hoops or guides 3 and 4 are secured to the third standard is slightly different, inasmuch as the guides overlap at this standard so that the desired circumferential length of the guides may be obtained. On this standard the arrangement of which is shown in the enlarged views Figs. 3 and 4, terminals 8 and 9 of the hoops or guides 3 and 4 respectively, are held at all times to the plate 5 by means of rivets 10, but the other terminals 11 and 12 of the hoops or guides 3 and 4 respectively have slots 13 therein in which are disposed the rivets 10 and by this arrangement, the terminals 11 and 12 of the hoops or guides 3 and 4 respectively, may be slid on the standard until the rivets 10 reach the terminals of the slots 13 in either direction. The terminals 11 and 12 which extend beyond the standard are held close to the opposite terminals of the said guides by means of keepers 14.

In the arrangement shown in Fig. 2 of the drawings, the hoops or guides 3 and 4 are constructed in the same way as the hoops or guides 3 and 4 shown in the construction shown in Fig. 1 of the drawings, but instead of having one set of terminals secured to the plate 5 they have one set of terminals secured to retainers 15 and 16, the other terminals 11 and 12 sliding with reference to the retainers 15 and 16, set screw 17 being disposed in the slots 13 to permit the terminals 11 and 12 to pass the retainers 15 and 16. These retainers 15 and 16 are held together by a cloth supporter 18 which has a terminal secured to each of the retainers 15 and 16 and has its body extending forwardly and downwardly to afford a space in which the lower part of the skirt may be held. This cloth supporter 18 has a sleeve 19 in which is disposed a standard 20, the sleeve 19 having a thumbscrew 21 which is adapted to be screwed against the standard 20 to hold the cloth supporter with the retainers 15 and 16 in place relatively thereto. The cloth supporter 18 has a pointer 22 which is disposed in front of the base of the standard 20, on which there is a scale. As in the case of the device shown in Fig. 1 it is understood that the hoops or guides 3 and 4 will only overlap at one standard, for at the other two standards the retainers 15 and 16 will be secured to the guides 3 and 4. When a dressmaker desires to measure the skirt circumferentially at a considerable height from the floor, with a view to sewing braid thereon or for any other purpose, the standard 20 is lengthened by the means shown in Fig. 7, the members of the standard having tongues 23 at one end and grooves 24 at the other and when the members dovetail, they are held together by means of a pin 25 which passes through the connection.

In using my invention, the skirt which is to be measured, is put on right side out, and my skirt measuring device is put over the head of the figure and the distance which the bottom of the skirt is to be from the ground having been determined, the hoops or guides 3 and 4 are adjusted to the proper height on the standards 1 or 20, either by means of the thumbscrews 7 with the plates 5 or by means of the thumbscrew 21 and the cloth supporter 18 secured to the retainers 15 and 16. The dress measuring device now being in place, the dressmaker may, with tailor's chalk of a suitable color, which will show on the cloth, mark a line at a given height from the floor, around the dress, the chalk being operated between the hoops or guides 3 and 4, and the dressmaker by holding the dress out against the guides will be able to make certain that the chalk line is even. The device may also be used by drawing the bottom 26, of the skirt, between the guides 3 and 4 as shown in Fig. 2, and by this means the skirt is clamped against the guides as best shown in the sectional view in Fig. 6 and when in this position, the dressmaker may mark the cloth at a proper distance from the floor, without danger of making a mistake so that at a certain place unevenness may occur.

It will be observed by referring to Fig. 2 of the drawings that when the cloth is drawn between the guides or hoops, that one of the hoops will serve as a means for holding the cloth against the other hoop for its complete circumference.

Having thus described my invention, I claim as new and desire to secure by Letters Patent:

1. A skirt measuring device which consists of a plurality of standards, parallel hoops, the terminals of each hoop overlapping, retainers for the hoops which serve as their supports, and means for securing adjustably the retainers to the standards respectively.

2. A skirt measuring device which consists of a plurality of standards, hoops, the terminals of which overlap, retainers for the hoops, one pair of retainers having a sliding engagement with one set of terminals of the hoops respectively, cloth supporting members having their terminals secured to the said retainers respectively, and means for adjustably securing the cloth supporting members relatively to the standards by which they are supported.

3. A skirt measuring device which consists of a plurality of standards, a hoop, the hoop being adjustable relatively to the standards, means for securing the hoop to the standards, and means serving to hold cloth against the hoop for its complete circumference.

4. A skirt measuring device which consists of a plurality of standards, a hoop, means for securing the hoop to the standards, and means serving to hold cloth against the hoop for its complete circumference.

5. A skirt measuring device which consists of a plurality of standards, hoops, retainers for the hoops, and cloth supporting members having their terminals secured to the retainers respectively, the cloth supporting members being supported by the standards.

6. A skirt measuring device which consists of hoops, standards, means for supporting the hoops, the said means leaving a space between the hoops for their complete circumferential length, and means for supporting the said means on the standards.

7. A skirt measuring device which consists of hoops, cloth supporting members, means for securing the hoops to the cloth supporting members, the said cloth supporting members leaving a space between the hoops for their complete circumferential length, standards, and means for securing the cloth supporting members to the standards.

8. A skirt measuring device which consists of hoops, cloth supporting members, means for securing the hoops to the cloth supporting members, the said cloth supporting members leaving a space between the hoops for their complete circumferential length, standards, sleeves secured to the cloth supporting members, the sleeves being disposed on the standards respectively, and means for securing the sleeves to the standards.

In testimony whereof I have signed my name to this specification in the presence of subscribing witnesses.

ANNA MARY ALLEN.

Witnesses:
   Mrs. J. O. SAMSON,
   MILES E. SANBORN,
   RUTHE B. SAMSON.